Patented June 30, 1931

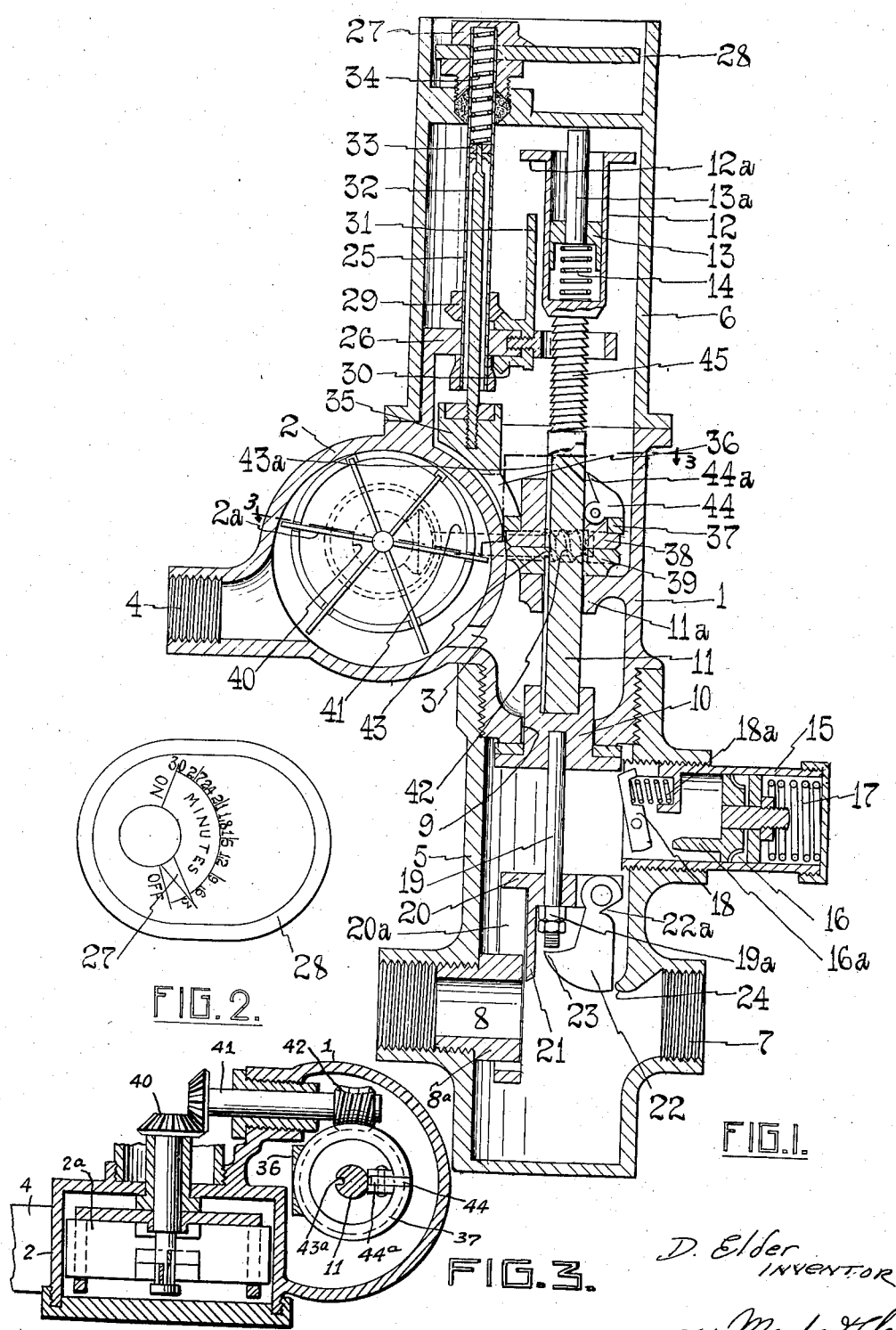

1,812,586

UNITED STATES PATENT OFFICE

DONALD ELDER, OF ONEHUNGA, NEW ZEALAND

APPARATUS FOR CONTROLLING THE PASSAGE OF WATER TO SPRAYERS AND THE LIKE

Application filed May 21, 1928. Serial No. 279,510.

This invention relates to apparatus employed for controlling the length of the periods during which water is permitted to flow to sprayers and other devices used for distributing water over areas of land or to elsewhere, or operated by water for various purposes, and has for its object the provision of an improved form of regulator which is positive in its action, will operate accurately, in accordance with the time periods to which it is set, and capable of being manipulated and set, to operate effectively and reliably, by those having little skill or practice in apparatus of the nature herein described.

The improved regulator comprises a barrel with a water motor attached and in communication therewith, mounted on a valve housing, and surmounted by a timing gear housing. A valve, controlling the water passageway between the valve housing to which the water supply is connected, and the barrel, is operated by the timing gear in the uppermost housing to allow water to pass to the motor and thence to a sprayer or other apparatus to which a flow of water is required for a predetermined period of time, said timing gear being set by utilizing as a stop, the radius of a cam related to the selected period, and being operated by the flow of water through the motor, to cause the before mentioned valve to cut off communication between the valve housing and the barrel at the expiration of the selected period, said valve in cutting off the flow of water to the barrel and the motor, also actuating a further valve to open a discharge port from the valve housing whereby water entering the latter is diverted to other apparatus or as required.

In order however that the invention may be readily understood it will be more particularly described in conjunction with the accompanying drawings wherein:—

Figure 1 is a sectional elevation of the improved regulator and,

Figure 2 is a part plan view thereof.

Figure 3 is a plan view in section on the line 3—3 of Figure 1.

The regulator comprises a barrel 1 having mounted thereon a water motor 2 the water inlet to which is via the port 3, and the discharge from which is by way of the outlet 4. The barrel 1 is mounted on a valve housing 5 while a timing gear housing 6 surmounts said barrel 1.

The valve housing 5 is provided with a water inlet 7 adapted to be connected with a source of water supply such as a water main, and is also provided with an outlet or discharge port 8 adapted to be connected with a further regulator or other apparatus or as may be desired.

The lower end of the barrel 1 extends into the valve housing 5, and contains a port 9 capable of being closed by a valve 10 rigidly attached to a stem 11 which extends upwards through a guide 11a in the barrel 1 and into the timing gear housing 6 in which is a small barrel 12 with a flange 12a around its upper end and secured on the upper end of the stem 11.

In the barrel 12 there is a plunger 13 with a stem 13a adapted to be forced upwards to contact with the top of the housing 6, by a spring 14 in compression between the bottom of said barrel 12 and said plunger 13 therein.

On the valve housing 5 below the port 9 adapted to be closed by the valve 10 is a casing 15 containing a plunger 16 between which and the outer end of said casing 15 there is placed a spring 17 in compression.

Pivoted in the mouth of the casing 15 is a pawl 18 which under the action of a spring 18a acting thereon tends to occupy a position as shown, in which it will hold the valve 10 up against the lower end of the barrel 1 to close the port 9. This position of the pawl 18 is however only possible when there is no pressure of water in the valve housing 5 to force the plunger 16 back into the casing 15 against the action of its spring 17, as otherwise with the latter free to assert itself the plunger 16 is forced towards the barrel 1 and a projection 16a on said plunger by engaging the lower end of the pawl 18 causes the latter to occupy a position in which it will clear the valve 10.

A rod 19 rigidly attached to the valve 10 extends downwards through a fitting 20 carrying a plate valve 21 adapted to close the discharge port 8 from the valve housing 5, said fitting 20 being provided with a vertical loop 20a, which passes on the nipple 8a, through which the port 8 is formed and provides a guide for the fitting 20 during vertical movement of same.

The rod 19 is slidable through the fitting 20 and has thereon below the latter, a nut or nuts 19a or other means, whereby on the rod 19 being raised it will take with it the fitting 20.

Suspended from the fitting 20 opposite the plate valve 21 is a catch 22 the latter being formed with a lip 23 which with the parts raised to the positions shown in the drawing is located below the rod 19, the back of said catch 22 resting against a projection 24 from the housing 5 above the water inlet 7. Upon the rod 19 descending it forces the catch 22 and with it the fitting 20 and plate valve 21 downwards until the latter closes the water discharge port 8, the catch 22 acts by reason of its contact with the projection 24 to cause the valve plate 21 to be closed by the action of spring 14 and upon the recess 22a in said catch 22 coming opposite the projection 24 after the valve is closed the rod 19 is enabled to force the lip 23 out of its road, so that said rod 19 and the parts connected thereto may continue their downward travel.

The timing gear contained in the housing 6, comprises a hollow vertical shaft 25 turnable in a support 26 and projecting through the top of said housing, a pointer 27 secured on the upper end of said hollow shaft 25 working over a dial 28 marked to designate the various periods of time for any selected one of which it is desired the apparatus shall operate.

Keyed on the hollow shaft 25 is a bevel gear 29 which meshes with a further bevel gear 30 rigidly attached to a cam 31 operable through a vertical plane and below the flange 12a of the barrel 12.

Within the hollow shaft 25 is a rod 32 having on its upper end a plunger 33 slidable in said shaft, a spring 34 in compression between the pointer 27 and said plunger 33 normally tending to force the latter downwards. To the lower end of the rod 32 there is rigidly secured a fitting 35, adapted under upward movement of the rod to seat against the lower end of said shaft, the fitting 35 carrying a bracket 36 with a ring 37 surrounding the upper of a pair of worm wheels 38, 39 surrounding the stem 11 and resting on the guide 11a through which the latter works, said wheels 38, 39 being formed so that they are both driven simultaneously from the rotor of the water motor 2 through bevel gearing 40 a shaft 41 and worm 42.

The lower wheel 39 is provided with a key 43 which is entered and is slidable in a keyway 43a cut in the pillar 11, so that the latter and the wheel 39 turn together, while the upper wheel 38 is rotatable about the pillar 11, and carries a pivoted catch 44 which rests on and slides around on the ring 37, said catch 44 being formed with an ear 44a adapted upon the ring 37 being raised to engage in a screw thread 45 cut in the stem 11, after the latter has descended to bring the screw thread opposite said ear 44a, which occurs on the valve 10 opening the port 9.

Further the upper wheel 38 is cut with a less number of teeth than the lower wheel 39 so that with both of the wheels 38, 39 driven by the same worm 42, the upper wheel 38 will be turned faster than the lower wheel 39.

To adjust the apparatus so that it will permit water to be delivered to a sprayer or other apparatus for a selected period of time, the pointer 27 is made to register with the period selected as represented on the dial 28, this operation causing the cam 31 to be brought by means of the shaft 25 and bevel gears 29, 30 to a position wherein the radius of the cam 31 related to the selected period, will occupy a vertical position below the flange 12a of the barrel 12.

If the water supply to the housing 5 via the inlet 7 has not already been cut off, it is now turned "off" and kept "off" for a short space of time, and there being no pressure of water in the housing 5 and casing 15, the spring 17 asserts itself and forces the plunger 16 so that the projection 16a engages the lower end of the pawl 18 and moves same so that its upper end clears the valve 10 which under the expansion of the spring 14 between the barrel 12 and plunger 13 commences to descend.

The spring 14 is provided as a safeguard against the valve 10 sticking to its seating, after long periods of non-use of the apparatus, or where back pressure obtaining in higher altitudes may prevent the valve and its attached parts from falling by gravity.

The descent of the valve 10 causes the rod 19 owing to the latter's engagement with the catch 22 to force the fitting 20 downwards with the result that as the port 9 is opened by the valve 10, the discharge port 8 from the housing 5 is closed by the plate valve 21, the rod 19 stem 11 and attached parts continuing their downward movement until such time as the recess 22a in the catch 22 comes opposite the projection 24, whereupon the rod 19 is enabled to force the catch 22 aside and the downward movement of the rod 19 and stem 11 to continue to the full extent permitted by the cam 31 on which the flange 12a of the barrel 12 finally comes to rest.

The water is then turned on to enter the housing 5 via the inlet 7, and the port 8 being closed and the valve 10 open, it passes to the barrel 1 and housing 6 and also to the motor 2 via the port 3, and is discharged from the apparatus through the outlet 4 to be led to a sprayer or other apparatus requiring a timed water supply.

The water in passing through the motor 2, drives the rotor 2a which in turn operates through the gearing 40, 41, 42, the worm wheels 38, 39.

The pressure of water in the housing 6 also acts in the hollow shaft 25 and forcing the plunger 33 therein upwards against the action of the spring 34 lifts the rod 32 carrying the fitting 35 with the bracket 36 and ring 37 thereon whereby the catch 44 is raised so that its ear 44a is engaged in the screw thread 45 cut in the stem 11.

Thus with the lower wheel 39 and the stem 11 turning together at a slower speed than the upper wheel 38 with the thread cut as shown, the latter will owing to its greater speed of rotation and its engagement with the screw thread 45, gradually raise the stem 11 through the wheel 39, the pitch of the screw thread 45, and the difference in the speeds of rotation of the wheels 38, 39 being determined to cause the raising of the stem 11 to occupy the full length of time represented by the marking on the dial 28 at which the pointer 27 is set.

The stem 11 rises with a quiet easy movement taking with it the valve 10 and as the latter enters the port 9, the nut 19a or equivalent means on the rod 19 engages the fitting 20 and commences to lift the plate valve 21 to open the discharge port 8, and with the water prevented from passing through the port 9, the pressure acts on the under surface of the valve 10 (which has a greater diameter than the port 8) and is utilized to do the heavy work of lifting the fitting 20 and its attached parts to open the discharge port 8 and also to complete the closing of the port 9 by the valve 10.

Also as the valve 10 enters the port 9, the stem 13a of the plunger 13 which projects a predetermined distance above the top of the barrel 12 contacts against the top of the housing 6, and owing to the compression of the spring 14 and the gradual displacement of water from the barrel 12, the valve 10 comes to rest up against its seating around the port 9 with a gradual movement, instead of with a thud, as would otherwise occur, with the full pressure of water acting on the valve 10.

The pressure of water in the housing 5 and casing 15 forces the plunger 16 in the casing 15 away from the pawl 18 so that the latter is enabled to project into the housing 5 under the action of its spring 18a ready to engage below the valve 10 immediately the latter is right up, and so prevent "water hammering" of the valve 10 which is so likely to occur, and also guarding against the valve 10 dropping should there be a momentary diminution of water pressure, a minimum pressure only of water being necessary to keep the plunger 16 in the casing 15 with its projection 16a clear of the pawl 18.

With the port 9 closed and the port 8 opened the regulator is put out of action, the water passing into the housing 5, and instead of passing to the motor 2 and through the discharge port 4, to the sprayer or apparatus which the regulator controls, passing via the port 8 from said housing 5, to a further regulator or elsewhere as may be desired.

In considering my invention as above described it will be evident that various modifications may be effected without deviating from the scope of the invention as defined in the appended claims.

What I do claim and desire to obtain by Letters Patent of the United States of America, is:—

1. Apparatus for the purpose described comprising a housing, a water motor associated with said housing, an inlet and an outlet for water under pressure actuating the apparatus, a passage leading water to said motor, valve means for controlling the flow of pressure water through said housing and for controlling the passage of water to the water motor, and means for controlling said valve means so that water is enabled to flow through the water motor during the functioning of the apparatus and to flow through the housing without passing through said motor when the apparatus is inoperative, and operating mechanism comprising a gradually displaced member actuated by said water motor, and a pawl member constraining the gradually displaced member to move in one direction during the operation of the apparatus, said pawl member being brought into operative position on the admission of water to the water motor and out of operative position by the cutting off of the water supply to said water motor, the gradually displaced member being freed by the movement of said pawl member to inoperative position to return to initial position upon the fall of pressure of the water supplied to the apparatus.

2. Apparatus as claimed in claim 1 comprising a vertically arranged housing having an inlet and outlet for water under pressure, a water motor drawing water from a point spaced from said inlet and outlet, and a valve controlling the flow of water to the water motor so connected to the valve controlling the flow of pressure water that when the water supply to the water motor is cut off operating water is free to flow through the housing without flowing through the water motor and vice versa.

3. Apparatus as claimed in claim 1 in which the movable member is formed as a stem provided with a threaded portion, an abutment arranged to be moved into contact with the thread during the movement of the water motor, the abutment riding out of the thread on reaching the termination thereof at or after which time said stem acts to cut off the flow of water to the water motor whereupon said abutment takes up a position out of contact with said rod which is then free to return to initial position.

4. Apparatus as claimed in claim 1 having means for adjusting the amount of movement of the gradually displaced member and thereby limiting the travel of said member.

5. Apparatus as claimed in claim 1 having means for adjusting the amount of movement of the gradually displaced member, said means being formed as an adjustable cam adapted to engage against a projection carried by the gradually displaced member and thereby limit the travel of said member toward initial position upon the cutting off of the water supply to the water motor thereby determining the initial setting of said member.

6. Apparatus as claimed in claim 1 comprising means for adjusting the amount of movement of said gradually moved member, said adjusting means comprising a visible setting plate provided with pointer and indices indicating divisions of time, the setting of the pointer to an index causing the apparatus to function during the length of time indicated by said index.

7. Apparatus as claimed in claim 1 in which the gradually moved member is formed as a threaded stem, a part rotated by the water motor acting to rotate said stem, an abutment member arranged to engage with said threaded portion during the admission of water to the water motor and thereby causing the threaded member to rise through said rotated part.

8. Apparatus as claimed in claim 1 comprising means for holding the valve controlling the flow of water to the water motor on its seat in closed position after the operation of said apparatus is stopped and during the time water under pressure is in communication with the interior of said apparatus, said means being arranged so that on the fall of pressure of the water the valve is permitted to open so as to be set for a new cycle of operations.

9. Apparatus as claimed in claim 1 comprising resilient means stressed by the movement of said gradually displaced member toward its limiting positions under the action of the water motor, said resilient means acting to initiate the return of said member to initial position.

10. Apparatus for the purpose set forth as in claim 1 wherein the gradually displaced member is formed as a threaded stem and has mounted thereon a pair of gear wheels having a different number of teeth and both driven by the same driving element, one wheel being slidably engaged with said stem and the other of said gear wheels being adapted to be engaged with the thread of said pillar so as to raise the latter through the other wheel.

11. Apparatus for the purpose set forth as in claim 1 wherein the gradually displaced member is formed as a threaded stem and has mounted thereon a pair of gear wheels having a different number of teeth and both driven by a single worm rotated by the water motor one of said gear wheels being slidably keyed on said stem and the other of said wheels being adapted to be engaged with the thread of said stem by a catch pivoted on said wheel entering the thread of the stem under the action of a plunger in the timing gear housing being forced upwards by water pressure in the latter.

12. Apparatus for the purpose set forth as in claim 1, wherein the gradually displaced member is formed as a threaded stem and has mounted thereon a pair of gear wheels having a different number of teeth and both driven by a single worm from the water motor on the barrel, one of said gear wheels being slidably keyed on said stem and the other of said wheels being adapted to be engaged with the thread of said stem by a catch pivoted on said smaller wheels entering the thread of the stem under the action of a plunger in the timing gear housing being forced upwards by water pressure in the latter and wherein the plunger operates under water pressure acting in a hollow shaft in said housing, against the action of a spring, and a ring attached to said rod and engaging the catch pivoted on one of the worm wheels.

13. Apparatus for the purpose set forth, according to claim 1, wherein the valve to which the gradually displaced member is connected, controls the water passageway between the valve housing and the barrel, said valve having secured thereto a rod slidable through a fitting carrying a valve adapted to control the water discharge port from said valve housing and wherein the valves in the valve housing are connected by a rod slidable through a fitting carrying the valve adapted to control the water discharge port from said housing, said rod having a stop below said fitting.

14. Apparatus for the purpose set forth, according to claim 1, wherein the valve to which the gradually displaced member is connected, controls the water passageway between the valve housing and the barrel, said valve having secured thereto a rod slidable through a fitting carrying a valve adapted to control the water discharge port from said valve housing and wherein the valves in the valve housing are connected by a rod slidable through a fitting carrying the valve adapted to control the water discharge port from said housing, said rod having a stop below said fitting and wherein the fitting has pivoted thereon a catch retained under the connecting rod, by a projection from the housing, said catch being formed with a recess by means of which said catch is enabled to be passed over the projection so as to be out of the travel of the rod.

15. Apparatus for the purpose set forth as in claim 1 wherein one of the valves in the valve housing is adapted to close the water passageway between the latter and the barrel, said valve being retained in its closed position by a spring pressed pawl engaging under the valve upon water pressure acting in said housing and wherein the spring pressed pawl is moved to clear the valve, upon the water pressure in said housing being released, by a projection from a spring pressed plunger in a casing on said housing.

16. Apparatus as claimed in claim 1 in which the gradually moved member is formed as a threaded stem, a part rotated by the water motor acting to rotate said stem, an abutment member arranged to engage with said theraded portion during the admission of water to the water motor and thereby causing the threaded member to rise through said rotated part, and means whereby the gradually moved member is rotated at a speed different from that of the water motor.

17. Apparatus for the purpose set forth, comprising a barrel; a water motor attached to and in communication with said barrel; a valve housing provided with a water inlet and water outlets supporting said barrel; a timing gear housing surmounting said barrel; connected valves in said valve housing for diverting water through either of the outlets from the valve housing; a screw threaded stem connected to one of said valves; gearing between the motor and said stem for turning and raising same; a cam serving as a stop for setting the timing gear; and means for adjusting said cam.

18. Apparatus for the purpose set forth according to claim 17, wherein the cam operates vertically beneath a flange on a barrel attached to said rod, said cam being adjustable through gearing, a shaft and a pointer working over a dial for adjusting said cam.

19. Apparatus for the purpose set forth, according to claim 17 wherein the screw threaded stem is attached to a barrel containing a plunger with a stem rising therefrom to contact with the top of the timing gear housing, said barrel also containing a spring in compression between its bottom and said plunger.

20. Apparatus for the purpose set forth, according to claim 17, wherein the valve to which the screw threaded stem is connected, controls the water passageway between the valve housing and the barrel, said valve having secured thereto a rod slidable through a fitting carrying a valve adapted to control the water discharge port from said valve housing.

21. Apparatus for the purpose set forth, as in claim 17 wherein one of the valves in the valve housing is adapted to close the water passageway between the latter and the barrel, said valve being retained in its closed position by a spring pressed pawl, engaging under the valve upon water pressure acting in said housing.

22. In apparatus for the purpose set forth, timing gear comprising a screw threaded stem connected with valves for diverting water through a housing; worm wheels on said stem driven from a single driving element operated through gearing from a motor driven by water passing through the apparatus, one of said wheels being slidably keyed on said stem, the other of said wheels being provided with means for engaging the screw thread of said stem so as to move the same.

23. In apparatus for the purpose set forth in claim 22, wherein the means for engaging the screw thread of the stem comprise a catch pivoted on one of the wheels, a ring on said wheel below said catch, a rod connected with said ring and a plunger in a housing adapted to be given upward movement by water pressure acting on said plunger for operating said catch.

24. In a liquid flow controlling apparatus provided with a passage for entry and outlet of liquid, a rotary device rotated by the flow of liquid through the apparatus, a valve adapted for closing the passage, and differential timing gear means operated by said rotary device arranged to actuate said valve.

25. In a liquid flow controlling apparatus provided with a passage for entry and outlet of liquid, a rotary device rotated by the flow of liquid through the apparatus, a valve adapted for closing the passage timing means operated by said rotary device arranged to actuate said valve upon a predetermined number of revolutions of said device, and means for opening said valve effective upon a drop in liquid pressure upon one side of said valve.

26. In a liquid flow controlling apparatus provided with a passage for entry and outlet of liquid, a rotary device rotated by the flow of liquid through the apparatus, a valve adapted for closing the passage, timing means including a worm engaging a wormwheel operated by said rotary device arranged to actuate said valve upon a predetermined number of revolutions of said device, and means for opening said valve effective upon a drop in liquid pressure upon one side of said valve.

27. In a liquid flow controlling apparatus provided with a passage for entry and outlet of liquid, a rotary device rotated by the flow of liquid through the apparatus, a valve adapted for closing the passage, timing means including a worm engaging differential worm-wheels operated by said rotary device arranged to actuate said valve upon a predetermined number of revolutions of said device, and means for opening said valve effective upon a drop in liquid pressure upon one side of said valve.

28. In a liquid flow controlling apparatus provided with a passage for entry and outlet of liquid, a rotary device within the body rotated by the flow of liquid through the apparatus, a valve adapted for closing the passage, timing means enclosed within said body operated by said rotary device arranged to actuate said valve for closing the same upon a predetermined number of revolutions of said device, and means for varying the number of revolutions at which said device becomes effective in actuating said valve, said last mentioned means being accessible at the outer side of said apparatus for manual operation.

29. In a liquid flow controlling apparatus provided with a passage for entry and outlet of liquid, a rotary device rotated by the flow of liquid through the apparatus, a valve adapted for closing the passage, and means operated by said rotary device arranged to actuate said valve including a stem on said valve, a pawl operative on said stem to control movement of the same and thereby the valve toward a closed position and stopping said rotary device, and timing mechanism controlling the time required to move said stem.

30. In a liquid flow controlling apparatus provided with a passage for entry and outlet of liquid, a rotary device rotated by the flow of liquid through the apparatus, a valve adapted for closing the passage, and means operated by said rotary device arranged to actuate said valve including a stem on said valve, a device operative on said stem to move the same and thereby the valve toward a closed position, means for releasing the stem for movement in opposite direction to open the valve, and manually controlled means for adjustably limiting the movement of said stem in said opposite direction.

31. In an automatic water cut-off device, a body with a passage therethrough affording a water inlet and an outlet, a valve across said passage, means rotated by water flowing through said passage arranged for automatically closing said valve after a predetermined time of opening, and a hydraulic plunger operatively associated with said valve in a manner to slow down the final closing movement of said valve and for stopping the rotation of said means by closure of the valve.

In testimony whereof I affix my signature.

DONALD ELDER.